(12) United States Patent
Gaur (10) Patent No.: US 7,801,104 B2
(45) Date of Patent: Sep. 21, 2010

(54) SYSTEM AND METHOD FOR REDUCING PACKET COLLISIONS IN WIRELESS LOCAL AREA NETWORKS

(75) Inventor: Sudhanshu Gaur, Burlingame, CA (US)

(73) Assignee: Hitachi, Ltd., Tokyo (JP)

( * ) Notice: Subject to any disclaimer, the term of this patent is extended or adjusted under 35 U.S.C. 154(b) by 552 days.

(21) Appl. No.: 11/588,624

(22) Filed: Oct. 26, 2006

(65) Prior Publication Data

US 2008/0101308 A1    May 1, 2008

(51) Int. Cl.
*H04Q 11/04* (2006.01)
(52) U.S. Cl. .............. 370/345; 370/338; 370/343; 455/450; 455/452.1
(58) Field of Classification Search .......... 370/343, 370/338, 345; 455/450, 452.1
See application file for complete search history.

(56) References Cited

U.S. PATENT DOCUMENTS

| | | | |
|---|---|---|---|
| 6,934,752 B1 | 8/2005 | Gubbi | |
| 6,967,937 B1 | 11/2005 | Gormley | |
| 7,058,071 B1* | 6/2006 | Myles et al. | 370/419 |
| 2002/0141425 A1* | 10/2002 | Merani et al. | 370/412 |
| 2004/0137907 A1 | 7/2004 | Kim | |
| 2004/0253996 A1* | 12/2004 | Chen et al. | 455/574 |
| 2005/0021864 A1 | 1/2005 | Sherman et al. | |
| 2005/0073973 A1 | 4/2005 | Laroia et al. | |
| 2005/0147041 A1* | 7/2005 | Zaki et al. | 370/235 |
| 2005/0233704 A1 | 10/2005 | Maekawa | |
| 2005/0243788 A1* | 11/2005 | Janczak | 370/341 |
| 2005/0249173 A1* | 11/2005 | Salokannel et al. | 370/338 |
| 2006/0009229 A1* | 1/2006 | Yuan et al. | 455/452.1 |
| 2006/0034219 A1 | 2/2006 | Gu et al. | |
| 2006/0171348 A1 | 8/2006 | Nokano | |
| 2006/0193274 A1 | 8/2006 | Yamagata | |

FOREIGN PATENT DOCUMENTS

EP          1615395 A1    1/2006
WO    WO2005008938 A2    1/2005

OTHER PUBLICATIONS

IEEE802.11 WG, "Draft Supplement to Part 11: Wireless Medium Access Control (MAC) and Physical Layer (PHY) Speficiations: Medium Access Control (MAC) Enhancements for Quality of Service (QoS)", IEEE 802.11, Nov. 2005.
C. Lim and C.-H. Choi, "TDM-Based Coordination Function (TCF) in WLAN for High Throughout," IEEE Global Telecommunications Conference, vol. 5, pp. 3235-3239, Nov. 2004.

* cited by examiner

*Primary Examiner*—Charles N Appiah
*Assistant Examiner*—William F Rideout
(74) *Attorney, Agent, or Firm*—Mattingly & Malur, P.C.

(57) ABSTRACT

A system (e.g., an AP or a STA) in a WLAN comprises slot information (e.g., slot association or slot bias information); a counter for counting slot numbers; and a medium access controller operative to monitor a wireless medium and to initiate transmission of a MAC frame during a current slot based an a distributed wireless access protocol (e.g., DCF or EDCA), on a current slot number (t) corresponding to the current slot as counted by the counter, and on the slot information. The medium access controller may initiate frame transmission when a backoff counter is zero and when t mod $N=n_i$ (such that N=number of STAs, and $n_i$=assigned slot number). Alternatively, the medium access controller may initiate frame transmission when a backoff counter is zero and when a slot bias mechanism effecting a probability of access to the wireless medium is satisfied.

5 Claims, 10 Drawing Sheets

**Default EDCA AC Parameter Set
for 802.11g**

| AC | CWmin | CWmax | AIFSN | TXOP limit (ms) |
|---|---|---|---|---|
| (1) AC_BK | 15 | 1023 | 7 | 0 |
| (0) AC_BE | 15 | 1023 | 3 | 0 |
| (2) AC_VI | 7 | 15 | 2 | 3.008 |
| (3) AC_VO | 3 | 7 | 2 | 1.504 |

| IDs | VO-1 | VO-2 | BE-1 | BE-2 |
|---|---|---|---|---|
| Initial IDs | 0 | 1 | 2 | 3 |
| After 1st Transmission | 1 | 2 | 3 | 0 |
| After 2nd Transmission | 2 | 3 | 0 | 1 |
| After 3rd Transmission | 3 | 0 | 1 | 2 |

FIG. 10

| IDs | VO-1 | VO-2 | BE-1 | BE-2 |
|---|---|---|---|---|
| Initial IDs | 0 | 1 | 2 | 3 |
| After 1st Transmission | 1 | 0 | 3 | 2 |
| After 2nd Transmission | 0 | 1 | 2 | 3 |
| After 3rd Transmission | 1 | 0 | 3 | 2 |

FIG. 11

SYSTEM AND METHOD FOR REDUCING PACKET COLLISIONS IN WIRELESS LOCAL AREA NETWORKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to wireless networks, and more particularly provides a system and method for reducing packet collisions in wireless local area networks (WLANs).

BACKGROUND

As users experience the convenience of wireless connectivity, they are demanding increasing support. Typical applications over wireless networks include video streaming, video conferencing, distance learning, etc. Because wireless bandwidth availability is restricted, quality of service (QoS) management is increasingly important in 802.11 networks.

The original 802.11 media access control (MAC) protocol was designed with two modes of communication for wireless stations. The first mode, Distributed Coordination Function (DCF), is based on Carrier Sense Multiple Access with Collision Avoidance (CSMA/CA), sometimes referred to as "listen before talk." A station waits for a quiet period on the network and then begins to transmit data and detect collisions. The second mode, Point Coordination Function (PCF), supports time-sensitive traffic flows. Using PCF, wireless access points (APs) periodically send beacon frames to communicate network identification and management parameters specific to the wireless local area network (WLAN). Between sending beacon frames, PCF splits time into a contention period where the stations implement a DCF protocol, and a contention-free period where an AP coordinates access by the various stations based on QoS requirements.

Because DCF and PCF do not differentiate between traffic types or sources, IEEE proposed enhancements to both coordination modes to facilitate QoS. These changes are intended to fulfill critical service requirements while maintaining backward-compatibility with current 802.11 standards.

Enhanced Distributed Channel Access (EDCA) introduces the concept of traffic categories. Using EDCA, stations try to send data after detecting that the medium is idle for a set time period defined by the corresponding traffic category. A higher-priority traffic category will have a shorter wait time than a lower-priority traffic category. While no guarantees of service are provided, EDCA establishes a probabilistic priority mechanism to allocate bandwidth based on traffic categories.

The IEEE 802.11e EDCA standard provides QoS differentiation by grouping traffic into four access classes (ACs), i.e. voice, video, best effort and background. Each transmission frame from the upper layers bears a priority value (0-7), which is passed down to the MAC layer. Based on the priority value, the transmission frames are mapped into the four ACs at the MAC layer. The voice AC has the highest priority; the video AC has the second highest priority; the best effort AC has the third highest priority; and the background AC has the lowest priority. Each AC has its own transmission queue and its own set of medium access parameters. Traffic prioritization uses the medium access parameters—AIFS interval, contention window (CW, CWmin and CWmax), and transmission opportunity (TXOP)—to ensure that a higher priority AC has relatively more medium access opportunity than a lower priority AC.

Generally, the arbitration interframe space (AIFS) is the time interval that a station must sense the medium to be idle before invoking a backoff mechanism or transmission. A higher priority AC uses a smaller AIFS interval. The contention window (CW, CWmin and CWmax) indicates the number of backoff time slots until the station can attempt another transmission. The contention window is selected as a random backoff number of slots between 0 and CW. CW starts at CWmin. CW is essentially doubled every time a transmission fails until CW reaches its maximum value CWmax. Then, CW maintains this maximum value until the transmission exceeds a retry limit. A higher priority AC uses smaller CWmin and CWmax. A lower priority AC uses larger CWmin and CWmax. The TXOP indicates the maximum duration that an AC can be allowed to transmit transmission frames after acquiring access to the medium. To save contention overhead, multiple transmission frames can be transmitted within one acquired TXOP without additional contention, as long as the total transmission time does not exceed the TXOP duration.

To reduce the probability of two stations colliding, because the two stations cannot hear each other, the standard defines a virtual carrier sense mechanism. Before a station initiates a transaction, the station first transmits a short control frame called RTS (Request To Send), which includes the source address, the destination address and the duration of the upcoming transaction (i.e. the data frame and the respective ACK). Then, the destination station responds (if the medium is free) with a response control frame called CTS (Clear to Send), which includes the same duration information. All stations receiving either the RTS and/or the CTS set a virtual carrier sense indicator, i.e., the network allocation vector (NAV), for the given duration, and use the NAV together with the physical carrier sense when sensing the medium as idle or busy. This mechanism reduces the probability of a collision in the receiver area by a station that is "hidden" from the transmitter station to the short duration of the RTS transmission, because the station hears the CTS and "reserves" the medium as busy until the end of the transaction. The duration information in the RTS also protects the transmitter area from collisions during the ACK from stations that are out of range of the acknowledging station. Due to the fact that the RTS and CTS are short, the mechanism reduces the overhead of collisions, since these transmission frames are recognized more quickly than if the whole data transmission frame was to be transmitted (assuming the data frame is bigger than RTS). The standard allows for short data transmission frames, i.e., those shorter than an RTS Threshold, to be transmitted without the RTS/CTS transaction.

With these medium access parameters, EDCA works in the following manner:

Before a transmitting station can initiate any transmission, the transmitting station must first sense the channel idle (physically and virtually) for at least an AIFS time interval. If the channel is idle after an initial AIFS interval, then the transmitting station initiates an RTS transmission and awaits a CTS transmission from the receiving station.

If a collision occurs during the RTS transmission or if CTS is not received, then the transmitting station invokes a backoff procedure using a backoff counter to count down a random number of backoff time slots selected between 0 and CW (initially set to CWmin). The transmitting station decrements the backoff counter by one as long as the channel is sensed to be idle. If the transmitting station senses the channel to be busy at any time during the backoff procedure, the transmitting station suspends its current backoff procedure and freezes its backoff counter until the channel is sensed to be idle for an AIFS interval again. Then, if the channel is still idle, the transmitting station resumes decrementing its remaining backoff counter.

Once the backoff counter reaches zero, the transmitting station initiates an RTS transmission and awaits a CTS transmission from the receiving station. If a collision occurs during the RTS transmission or CTS is not received, then the transmitting station invokes another backoff procedure, possibly increasing the size of CW. That is, as stated above, after each unsuccessful transmission, CW is essentially doubled until it reaches CWmax. After a successful transmission, CW returns to its default value of CWmin. During the transaction, the station can initiate multiple frame transmissions without additional contention as long as the total transmission time does not exceed the TXOP duration.

Figure 1:
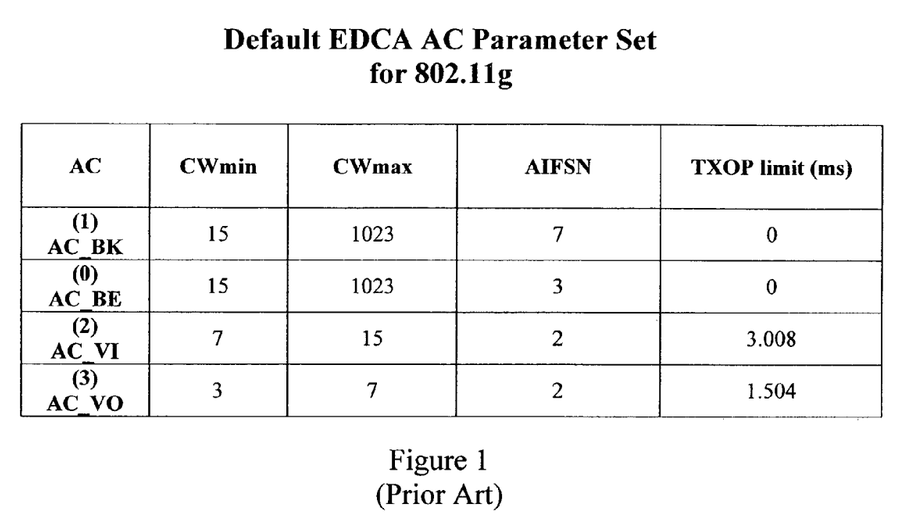
FIG. 1 is a table of a prior art EDCA AC parameter set for 802.11g.

The level of QoS control for each AC is determined by the combination of the medium access parameters and the number of competing stations in the network. The default EDCA parameter values used by non-AP QoS stations (QSTAs) are identified in FIG. 1. A TXOP_Limit value of 0 indicates that a single MAC service data unit (MSDU) or MAC protocol data unit (MPDU), in addition to a possible RTS/CTS exchange or CTS to itself, may be transmitted at any rate for each TXOP.

Hybrid Coordination Function Controlled Channel Access (HCCA) uses the concepts of PCF, but essentially substitutes the protocols of DCF with the improved protocols of EDCA. That is, using HCCA, APs periodically send beacon frames. Between beacon frames, HCCA splits time into a contention period and a contention-free period. During the contention period, EDCA protocols are used. During the contention-free period, the AP coordinates access by the various stations based on QoS requirements.

Networks implementing AP coordinated access, e.g., PCF and HCCA, require complex implementation and substantial overhead. Accordingly, network designers prefer to implement simpler networks using distributed wireless access, e.g., DCF or EDCA. However, because stations implementing distributed wireless access, e.g., DCF, EDCA, etc., seize access to the wireless medium without a coordinator, collisions occur (especially when many stations are competing for access to a wireless channel). Further, different ACs do not preclude the chance of a low priority packet colliding with a higher priority packet. Accordingly, systems and methods are needed that can reduce the risk of collisions in networks that implement distributed wireless access and particularly when implementing multiple access classes, e.g., using EDCA.

Example prior art references include the following:
1. U.S. Pat. No. 6,934,752 B1 to Gubbi
2. U.S. Pat. No. 6,967,937 B1 to Gormley
3. U.S. Patent Appl. Public. No. 2004/0137907A1 to Kim
4. U.S. Patent Appl. Public. No. 2005/0021864A1 to Sherman, et al.
5. U.S. Patent Appl. Public. No. 2005/0073973A1 to Laroia et al.
6. U.S. Patent Appl. Public. No. 2005/0233704A1 to Maekawa
7. U.S. Patent Appl. Public. No. 2005/0243788A1 to Janczak
8. U.S. Patent Appl. Public. No. 2006/0171348A1 to Nokano
9. U.S. Patent Appl. Public. No. 2006/0193274A1 to Yamagata
10. IEEE 802.11 WG, "Draft Supplement to Part 11: Wireless Medium Access Control (MAC) and Physical Layer (PHY) Specifications: Medium Access Control (MAC) Enhancements for Quality of Service (QoS)", IEEE 802.11e, November 2005
11. C. Lim and C-H, Choi, "TDM-based coordination function (TCF) in WLAN for high throughout", IEEE Global Telecommunications Conference, Vol. 5, pp. 3235-3239, November 2004
12. US20060034219 A1, "Signaling in a wireless network with sequential coordinated channel access
13. EP1615395 A1, "Contention-free access point controlled sequential access in WLAN 802.11e"
14. WO2005008938 A2, "Implementing 'All Wireless' Network over WiFi equipment using 'Scheduled TDMA'"

SUMMARY

In accordance with one embodiment, the present invention provides a system in a wireless local area network, comprising slot information; a counter for counting slot numbers; and an access controller operative to monitor a wireless medium and to initiate transmission of a MAC frame during a current slot based on a distributed wireless access protocol, on a current slot number corresponding to the current slot as counted by the counter, and on the slot information.

The slot information may include one of slot assignment information or slot bias information. The system may be operative in an access point, and may further comprise a server module operative to communicate the slot information to wireless stations in the wireless local area network. The server module may be further operative to generate the slot information based on at least one of the total number of wireless stations in the wireless local area network, wireless station priority, access class priority, wireless station response time, wireless station information, or a random pattern. The system may be operative in a wireless station. The distributed wireless access protocol may include one of DCF or EDCA. The distributed wireless access protocol may include EDCA; the slot information may correspond to a particular access class, and the slot information corresponding to the particular access class may be rotated dynamically among predetermined slot information values. The access controller may initiate the transmission of the MAC frame when a backoff counter is zero and when t mod $N=n_i$, where t is the current slot number, N is the total number of wireless stations in the wireless local area network, and $n_i$ is a slot number assigned to a wireless station as the slot information. The access controller may initiate the transmission of the MAC frame when a backoff counter is zero and when a slot bias mechanism is satisfied, the slot bias mechanism operative to effect a probability of access to the wireless medium. The slot bias mechanism may generate a random number and compares the random number against a high probability value when t mod $N=n_i$, where t is the current slot number, N is the total number of wireless stations in the wireless local area network, and $n_i$ is a slot number assigned to a wireless station as the slot information, and may compare the random number against a lower probability value when t mod $N \neq n_i$.

In accordance with another embodiment, the present invention provides a method in a wireless local area network, comprising identifying a MAC frame intended for transmission on a wireless medium; monitoring the wireless medium; counting slot numbers; and initiating transmission of the MAC frame during a current slot based on a distributed wireless access protocol, on a current slot number corresponding to the current slot as counted by the slot counter, and on slot information.

The slot information may include one of slot assignment information or slot bias information. The method may be operative in an access point, and may further comprise communicating the slot information by the access point to wireless stations in the wireless local area network. The method may further comprise generating the slot information based on at least one of the total number of wireless stations in the wireless local area network, wireless station priority, access class priority, wireless station response time, wireless station information, or a random pattern. The method may be operative in a wireless station. The distributed wireless access protocol may include EDCA; the slot information may correspond to a particular access class, and the method may further comprise rotating dynamically the slot information corresponding to the particular access class among predetermined slot information values. The initiating of the transmission of the MAC frame may occur when a backoff counter is zero and when $t \mod N=n_i$, where t is the current slot number, N is the total number of wireless stations in the wireless local area network, and $n_i$ is a slot number assigned to a wireless station as the slot information. The initiating of the transmission of the MAC frame may occur when a backoff counter is zero and when a slot bias mechanism is satisfied, the slot bias mechanism operative to effect a probability of access to the wireless medium. The slot bias mechanism may generate a random number and compare the random number against a high probability value when $t \mod N=n_i$, where t is the current slot number, N is the total number of wireless stations in the wireless local area network, and $n_i$ is a slot number assigned to a wireless station as the slot information, and may compare the random number against a lower probability value when $t \mod N \neq n_i$.

In accordance with still another embodiment, the present invention provides a system in a wireless local area network, comprising an access point (AP) including a server module for generating slot information for the AP and stations (STAs); an AP counter for counting slot numbers; and an AP medium access controller for monitoring a wireless medium and for initiating transmission of a MAC frame during a current slot based on a distributed wireless access protocol, on a current slot number corresponding to the current slot as counted by the AP counter, and on the slot information; and at least one STA including a client module for receiving the slot information generated by the server module; a STA counter for counting slot numbers; and a STA medium access controller for monitoring a wireless medium and for initiating transmission of a MAC frame during a current slot based on a distributed wireless access protocol, on a current slot number corresponding to the current slot as counted by the STA counter, and on the slot information.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

To reduce the risk of packet collisions while maintaining fairness and simplicity in wireless local area networks (WLANs) implementing distributed wireless access, embodiments of the invention add minimal intelligence to an access point (AP). Reducing packet collisions in a WLAN may improve network throughput, network latency and wireless station (STA) power efficiency. Generally, the AP generates and broadcasts slot information to the STAs. The AP and the STAs use the slot information to effect slot discrimination, thereby reducing the risk of packet collisions. In one embodiment, each of the AP and STAs modifies the back-off procedure of the EDCA protocol of IEEE 802.11e.

Figure 2:
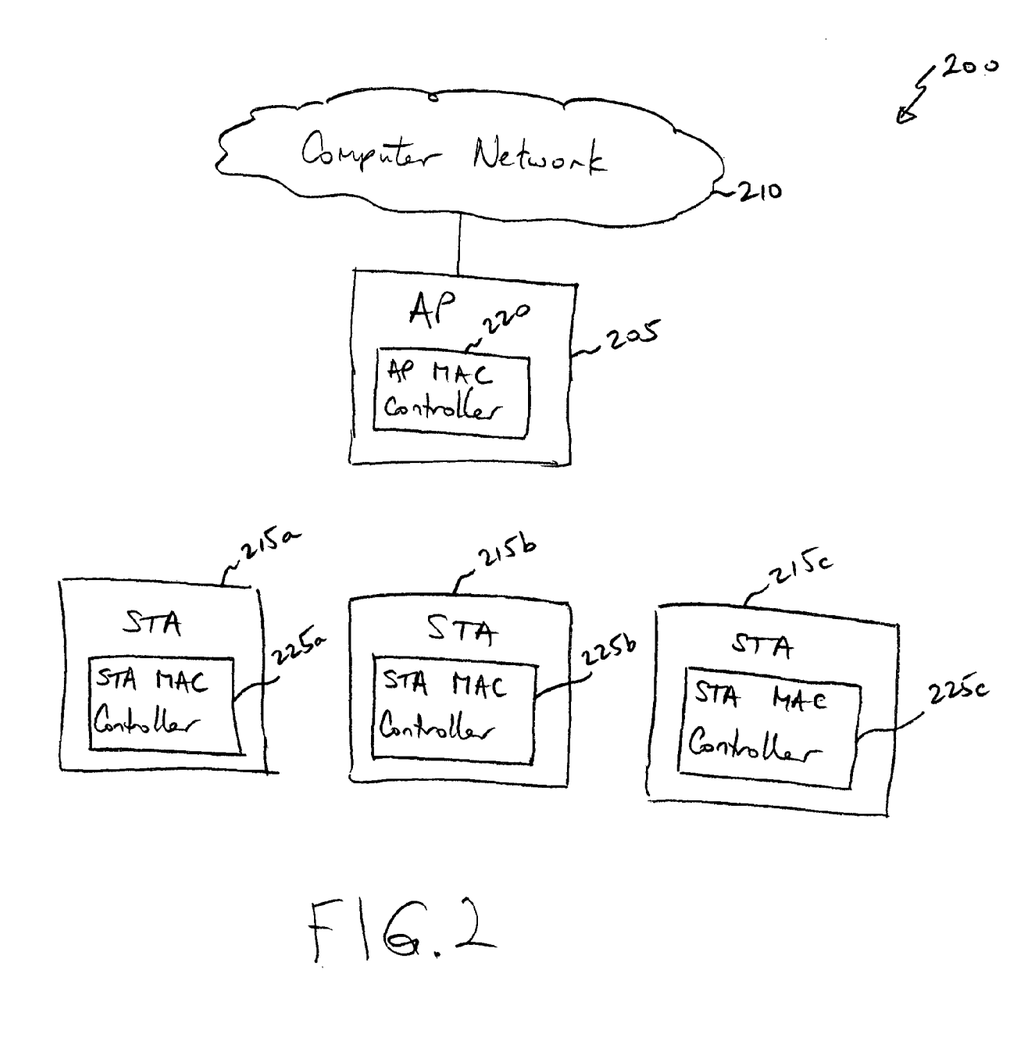
FIG. 2 is a block diagram illustrating a wireless local area network using slot discrimination, in accordance with an embodiment of the present invention.

FIG. 2 is a block diagram illustrating a WLAN 200 implementing distributed wireless access and slot discrimination, in accordance with an embodiment of the present invention. The WLAN 200 includes an AP 205 coupled to a computer network 210, such as the wide area network (WAN) commonly referred to as the Internet. In one embodiment, the AP 205 is coupled to the computer network 210 via a wired connection, although a wireless connection is also possible. The WLAN 200 also includes three (3) STAs, namely, STA 215a, STA 215b and STA 215c (although any number of STAs is possible). Each STA 215a, 215b, 215c is in wireless communication with the AP 205 via the wireless medium. Each STA 215a, 215b, 215c is generally referred to herein as STA 215, although each need not be identical.

The AP 205 includes an AP medium access control (MAC) controller 220, which includes hardware, software and/or firmware operative to control distributed wireless access to the wireless medium by the AP 205 and to control slot discrimination by the AP 205 and the STAs 215. Details of the AP MAC controller 220 are provided with reference to FIGS. 3 and 4.

The STA 215a includes a STA MAC controller 225a; the STA 215b includes a STA MAC controller 225b; and the STA 215c includes a STA MAC controller 225c. Each STA MAC controller 225a, 225b, 225c is generally referred to herein as STA MAC controller 225, although each need not be identical. The STA MAC controller 225 includes hardware, software and/or firmware to control distributed wireless access to the wireless medium by each STAs 215, and to control slot discrimination based on the slot information provided by the AP MAC controller 220.

Specifically, in one embodiment, the AP MAC controller 220 effects slot discrimination by slot association. The AP MAC controller 220 assigns a unique number $n_i$ to the $i^{th}$ STA 215 of N total STAs 215 in the WLAN 200. Each STA MAC controller 225 follows the EDCA backoff mechanism to gain access to the wireless medium with a few modifications. Namely, the $i^{th}$ STA 215 transmits when the STA MAC controller 225 determines that its backoff counter is zero and the current slot number (t) satisfies t mod N=$n_i$. Otherwise, the STA 215 defers transmission until next available slot that satisfies the above condition. If each STA 215 is assigned its own slot during which to initiate packet transmission, packet collisions are avoided.

In another embodiment, the AP MAC controller 220 effects slot discrimination by slot bias. The AP MAC controller 220 broadcasts slot information indicating slot bias values. Each STA MAC controller 225 follows the EDCA backoff mechanism to gain access to the wireless medium with a few modifications. Each STA 215 transmits when its backoff counter is zero and when a slot bias mechanism based on the slot number and the slot bias values is satisfied. Thus, by using the slot bias mechanism, the AP MAC controller 220 biases each STA MAC controller 225 to one or more slots without precluding the use of the other slots. By biasing each STA 215 to one or more slots, the risk of packet collisions can be reduced.

One skilled in the art will recognize that, in some embodiments, more than one STA 215 may be associated with or biased to the same slot. The risk of packet collisions will be reduced. In another embodiment, the slot information may assign slot associations or slot bias values to each access class (AC) within a STA 215. That way, slot discrimination may apply on an AC basis, effectively to grant greater access to the wireless medium by a higher priority AC packet than a lower priority AC packet. Further, a higher priority STA 215 or AC may be assigned more slot associations or more higher priority slots than a lower priority STA 215 or AC.

Whenever network conditions change, the AP 205 can send updated slot information. For example, the AP 205 may send updated slot information each time a STA 215 joins or leaves the WLAN 200.

Figure 3:
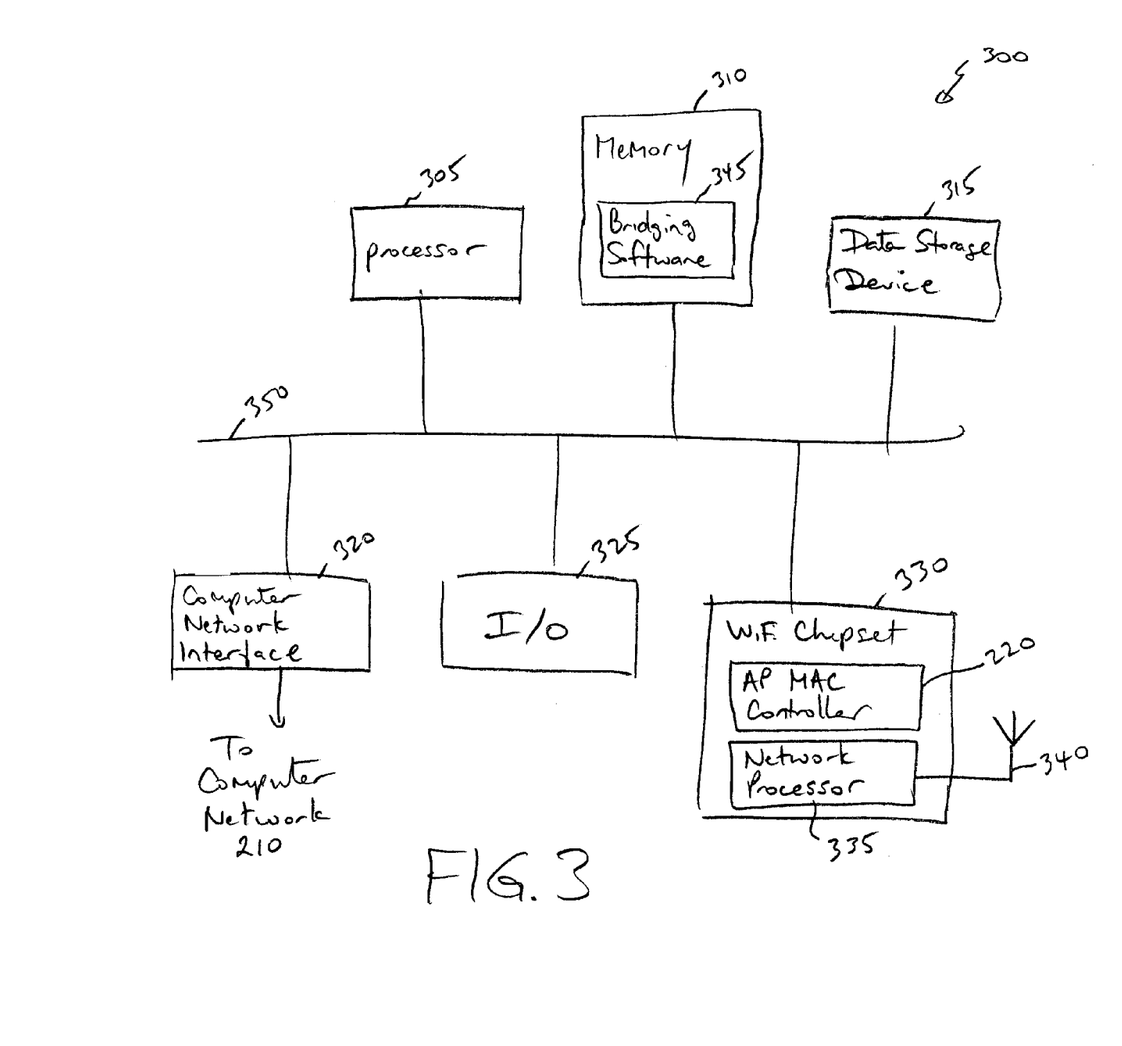
FIG. 3 is a block diagram illustrating details of an access point of FIG. 2, in accordance with an embodiment of the present invention.

FIG. 3 is a block diagram illustrating details of an AP 205, in accordance with an embodiment of the present invention. The AP 205 includes a processor 305 (such as an Intel Pentium® microprocessor or a Motorola Power PC® microprocessor), memory 310 (such as random-access memory), a data storage device 315 (such as a magnetic disk), a computer network interface 320, input/output (I/O) 325 (such as a keyboard, mouse and LCD display), and a WiFi chipset 330, each coupled to the communication channel 350. The computer network interface 320 may be coupled to the computer network 210. One skilled in the art will recognize that, although the memory 310 and the data storage device 315 are illustrated as different units, the memory 310 and the data storage device 315 can be parts of the same unit, distributed units, virtual memory, etc. The term "memory" herein is intended to cover all data storage media whether permanent or temporary.

The memory 310 stores bridging software 345 that enables communications between the WiFi chipset 330 and the computer network interface 320. The WiFi chipset 330 contains the AP MAC controller 220 and a network processor 335 coupled to a wireless antenna 340. Details of the AP MAC controller 220 are described below with reference to FIG. 4.

Figure 4:
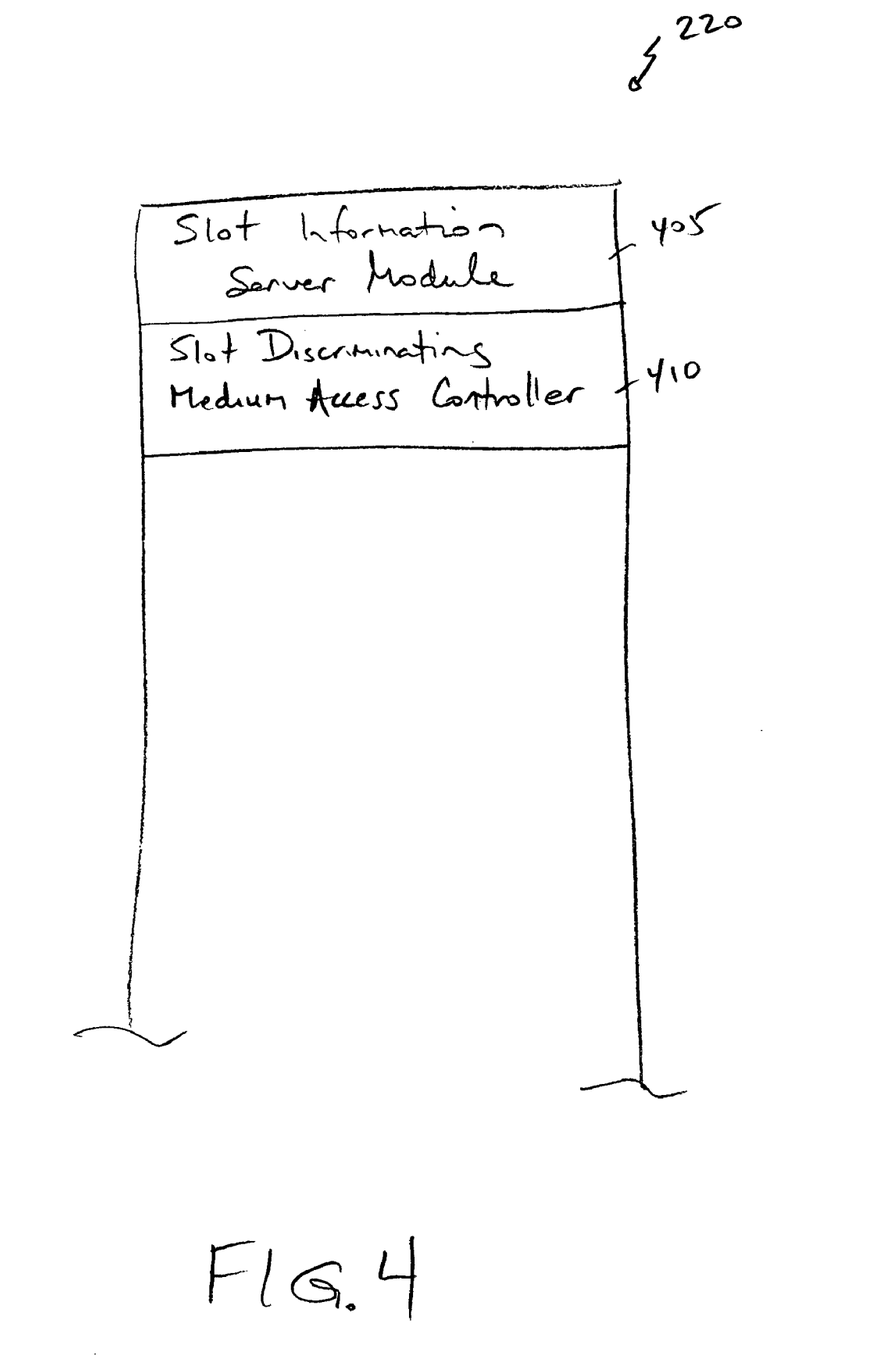
FIG. 4 is a block diagram illustrating details of an AP MAC controller of FIG. 3, in accordance with an embodiment of the present invention.

FIG. 4 is a block diagram illustrating details of an AP MAC controller 220, in accordance with an embodiment of the present invention. The AP MAC controller 220 includes a slot information server module 405 and a slot-discriminating medium access controller (SDMAC) 410.

The slot information server module 405 includes hardware, software and/or firmware operative to generate slot information for the AP 205 and the STAs 215, and to communicate the slot information to each STA 215. In one embodiment, the slot information server module 405 polls the STAs 215 to determine who is present in the WLAN 200. All STAs 215 operating in the WLAN 200 report identifying information to the slot information server module 405. The slot information server module 405 generates and sends slot information to each of the STAs 215 in the WLAN 200, respectively, such that each STA 215 uses its respective slot information to effect slot discrimination. The slot information server module 405 informs the SDMAC 410 of the slot information for effecting slot discrimination by the AP 205.

In one embodiment, the specific slot information effects slot association. That is, a particular STA 215 may be associated with a particular slot (possibly a dedicated slot or a shared slot) or possibly multiple slots (possibly multiple dedicated slots, multiple shared slots or a combination). The specific slot information sent by the slot information server module 405 may include a number $n_i$ between 1 and N (N being the total number of STAs 215 in the WLAN 200) and the number N. For example, the slot information server module 405 may assign slot number 1 of 3 total slots to the STA 215a to inform the STA 215a that it should use the first of each group of three slots.

In another embodiment, the specific slot information effects slot bias. That is a particular STA 215 may be biased to use a particular slot over other slots, but not to preclude the STA 215 from using the other slots. Accordingly, the specific slot information may include probability values and/or probability value identifiers and/or a number between 1 and N (which is translated to a known probability value) and/or weighting values (which effects a probability) and/or the like. The specific slot information may include two probability parameters $P_H$ and $P_L$, which are frame transmission probabilities and depend on the network topology such as total number of nodes, total number of high priority nodes, etc. For example, the slot information server module 405 may provide slot information to instruct the STA 215a to assign slot number 1 of every 3 slots a probability value of 0.8 and all other slots a probability value of 0.2. That way, the STA 215a may be four (4) times more likely to use slot number 1 than slot number 2 or 3. One skilled in the art may recognize that a STA 215 may be assigned higher probability parameters, e.g., $P_H$, for multiple slots, whether dedicated or shared.

The slot information server module 405 may match slot associations and/or slot probability values to each STA 215 based on station priority, AC priority, STA MAC addresses, STA response time, randomly, etc.

The SDMAC 410 includes hardware, software and/or firmware operative to manage slot-discriminating distributed wireless access by the AP 205. For example, the SDMAC 410 implements EDCA procedures with slot discrimination. In one embodiment, the SDMAC 410 of the AP 205 transmits when the SDMAC 410 determines that its backoff counter is zero and the current slot number (t) satisfies t mod $N=n_i$. Otherwise, the SDMAC 410 defers transmission until next available slot that satisfies the above condition. In another embodiment, the SDMAC 410 of the AP 205 transmits when its backoff counter is zero and when a slot bias mechanism based on the slot number and the slot bias values is satisfied. For example, the SDMAC 410 transmits if a random number X (e.g., a number chosen randomly between 0 and 1) is less than the slot bias value $SBV_i$ (e.g., a number between 0 and 1) for the current slot. That is, the SDMAC 410 transmits if $X[0,1]<SBV_i$. $P_H$ and $P_L$ are example SBVs. Maintaining slot numbers by the AP 205 is described in greater detail with reference to FIG. 7.

Figure 5:
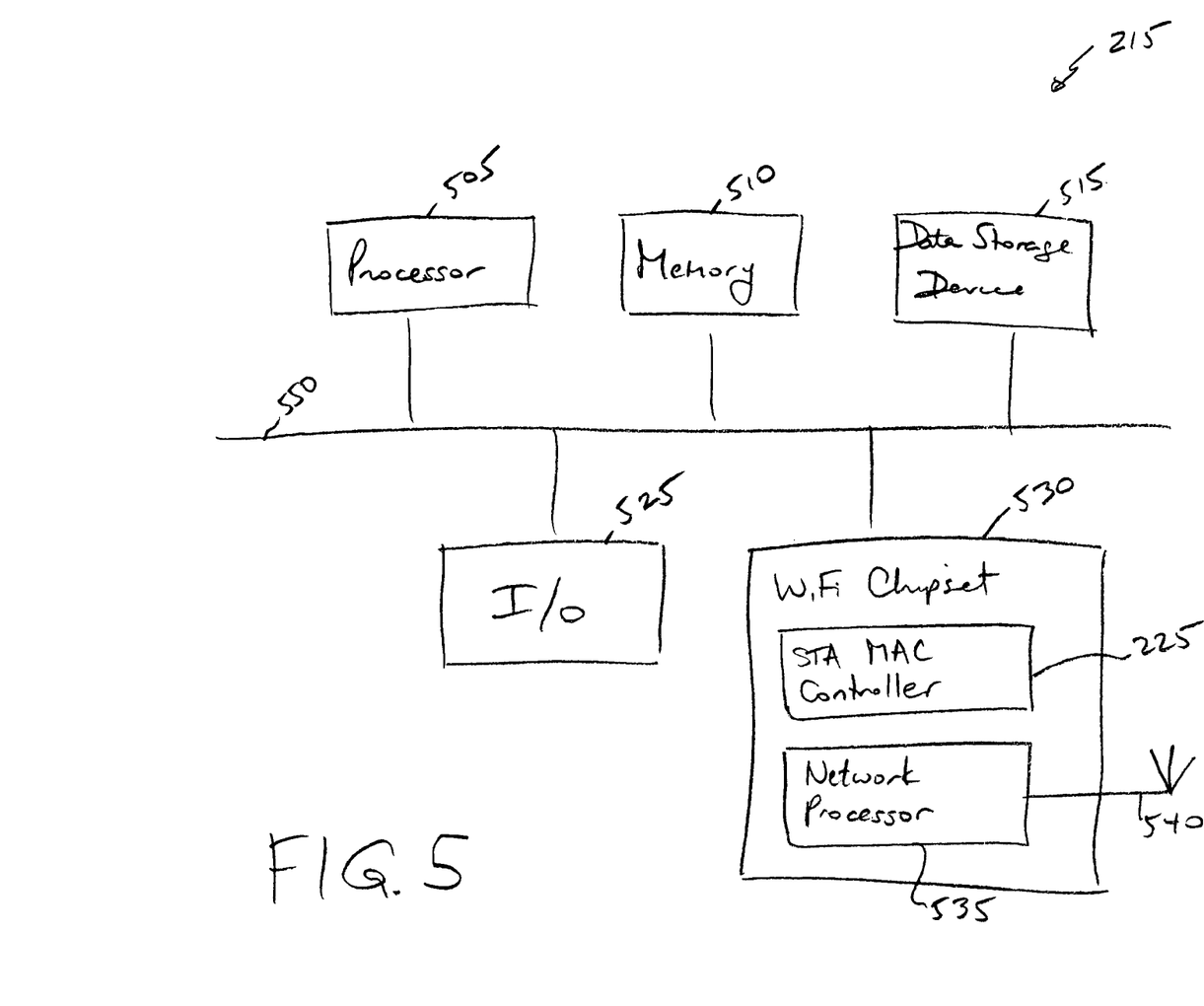
FIG. 5 is a block diagram illustrating details of a wireless station of FIG. 2, in accordance with an embodiment of the present invention.

FIG. 5 is a block diagram illustrating details of a STA 215, in accordance with an embodiment of the present invention. The STA 215 includes a processor 505 (such as an Intel Pentium® microprocessor or a Motorola Power PC® microprocessor), memory 510 (such as random-access memory), a data storage device 515 (such as a magnetic disk), input/output (I/O) 525 (such as a keyboard, mouse and LCD display), and a WiFi chipset 530, each coupled to the communication channel 550. One skilled in the art will recognize that, although the memory 510 and the data storage device 515 are illustrated as different units, the memory 510 and the data storage device 515 can be parts of the same unit, distributed units, virtual memory, etc. The term "memory" herein is intended to cover all data storage media whether permanent or temporary.

The WiFi chipset 530 may contain the STA MAC controller 225 and a network processor 535 coupled to a wireless antenna 540. Details of the STA MAC controller 225 are described below with reference to FIG. 6.

Figure 6:
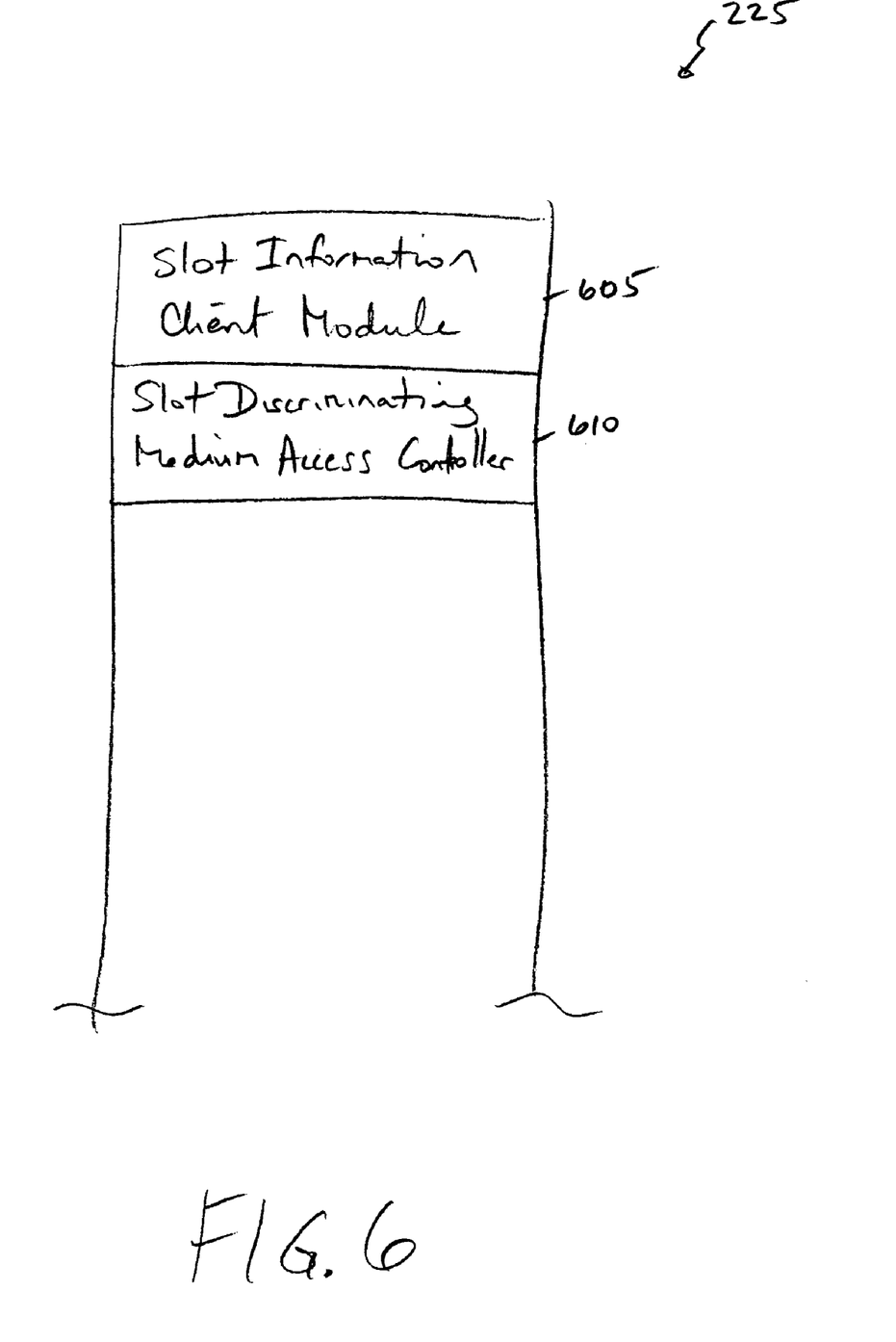
FIG. 6 is a block diagram illustrating details of a STA MAC controller of FIG. 5, in accordance with an embodiment of the present invention.

FIG. 6 is a block diagram illustrating details of the STA MAC controller 225, in accordance with an embodiment of the present invention. The STA MAC controller 225 includes a slot information client module 605 and an SDMAC 610.

The slot information client module 605 includes hardware, software and/or firmware operative to obtain slot information from the slot information server module 405 of the AP 205. From the slot information server module 405, the slot information client module 605 receives a poll inquiring who is present in the WLAN 200. In response to the poll, the slot information client module 605 reports identifying information back to the slot information server module 405. Thereafter, the slot information client module 605 receives slot information from the slot information server module 405, thereby enabling the STA 215 to effect slot discrimination.

As stated above, in one embodiment, the specific slot information effects slot association. That is, a particular STA 215 may be associated with a particular slot (possibly a dedicated slot or a shared slot) or with multiple slots (possibly multiple dedicated slots, multiple shared slots or a combination). The specific slot information sent by the slot information server module 405 may include a number $n_i$ between 0 and N-1 (N being the total number of STAs 215 in the WLAN 200) and the number N. For example, the slot information server module 405 may assign slot number 1 of 3 total slots to the STA 215a to inform the STA 215a that it should use the first of each group of three slots.

As stated above, in another embodiment, the specific slot information effects slot bias. That is a particular STA 215 may be biased to use a particular slot over other slots, but not to preclude the STA 215 from using the other slots. Accordingly, the specific slot information may include probability values and/or probability value identifiers and/or a number between 0 and N-1 (which is translated to a known probability value) and/or weighting values (which effects a probability) and/or the like. For example, the slot information server module 405 may provide slot information to instruct the STA 215a to assign slot number 1 of every 3 slots a probability value of 0.8 ($P_H$) and all other slots a probability value of 0.2 ($P_L$). That way, the STA 215a may be four (4) times more likely to use slot number 1 than slot number 2 or 3.

The slot-discriminating medium access controller (SDMAC) 610 includes hardware, software and/or firmware operative to manage slot-discriminating distributed wireless access. For example, the SDMAC 610 implements EDCA procedures with slot discrimination. In one embodiment, the SDMAC 610 of each STA 215 transmits when the SDMAC 610 determines that its backoff counter is zero and the current slot number (t) satisfies t mod $N=n_i$. Otherwise, the SDMAC 610 defers transmission until next available slot that satisfies the above condition. In another embodiment, the SDMAC 610 of each STA 215 transmits when its backoff counter is zero and when a slot bias mechanism based on the slot number and the slot bias values is satisfied. For example, the SDMAC 410 transmits if a random number X (e.g., a number chosen randomly between 0 and 1) is less than the slot bias value $SBV_i$ (e.g., a number between 0 and 1) for the current slot. That is, the SDMAC 610 transmits if $X[0,1]<SBV_i$. As stated above, $P_H$ and $P_L$ are example SBVs. Maintaining slot numbers by the STAs 215 is described in greater detail with reference to FIG. 7.

Figure 7:
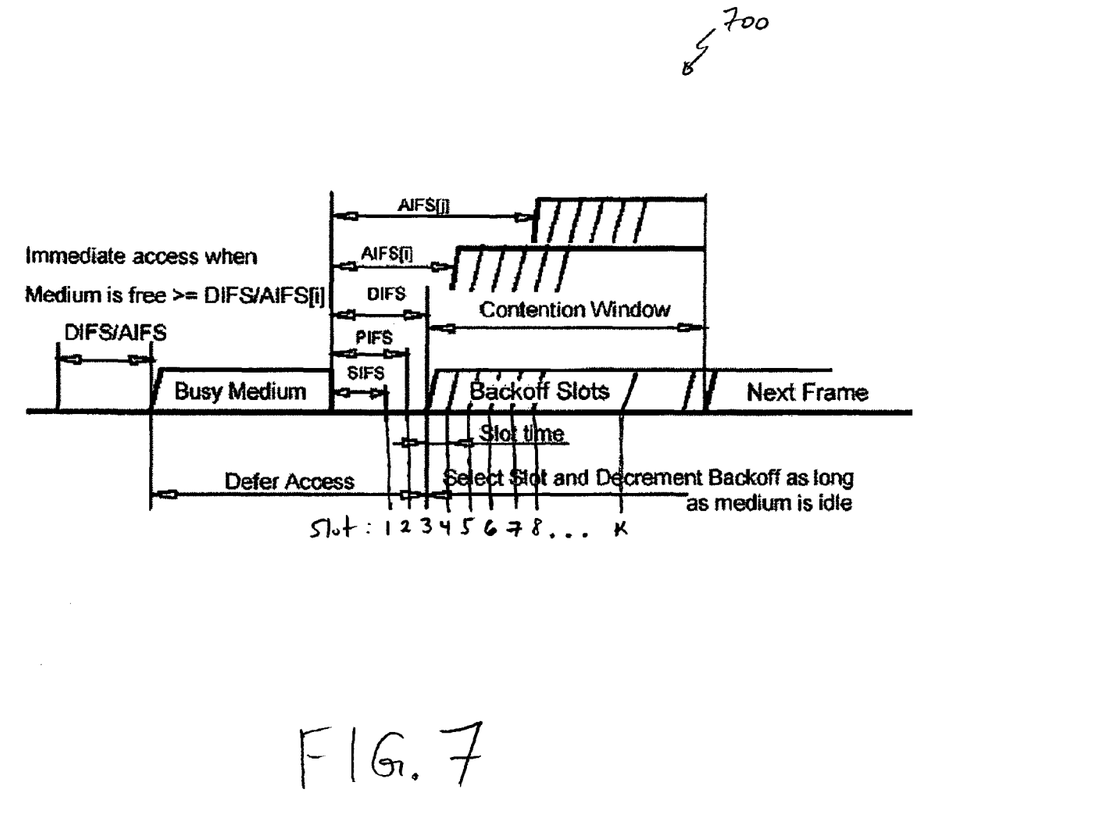
FIG. 7 is a timing diagram illustrating timing details of slot counting, in accordance with an embodiment of the present invention.

FIG. 7 is a timing diagram 700 illustrating EDCA timing details and slot counting, in accordance with an embodiment of the present invention. Before discussing the timing diagram 700, a brief explanation of the different timing components is helpful. The short interframe space (SIFS) provides a short delay for packets that must be transmitted as quickly as possible, e.g., management and control frames such as ACKs. There is no random backoff mechanism for packets using SIFS, since frames using SIFS do not involve multiple STAs competing for access to the wireless medium. The point coordinated function (PCF) interframe space (PIFS) is used for data frames in networks using PCF. PIFS is not widely used due to associated overhead and lack of flexibility of PCF and PIFS. The distributed coordinated function (DCF) interframe space (DIFS) is used for data frames in networks using DCF. Such frames wait a DIFS time period before beginning a random backoff procedure. DIFS is longer than SIFS and PIFS to enable traffic using SIFS or PIFS timing to get an opportunity to send before traffic using DIFS. As stated in the above background, the arbitrary interframe space (AIFS) is used by data frames in networks using EDCA (multiple ACs of different access priorities).

As shown, slots are counted after the expiration of SIFS. A slot counter may be used for this purpose. It may be difficult to generate a slot number from AIFSN and the backoff counter value, since the backoff counter stops counting when the wireless channel becomes busy and resumes an AIFS time period after the channel resumes being idle. Thus, since the number of measured AIFS durations is not known, one embodiment uses a dedicated slot counter.

In one embodiment, the slot counter resets an SIFS time period after each time the wireless channel goes idle. That way, different STAs 215 joining the contention period at the end of different busy periods initiate (or re-initiate) the slot counter at the same time. Thus, the AP 205 and each STA 215 are capable of maintaining the same slot numbers for wireless access contention.

Figure 8:
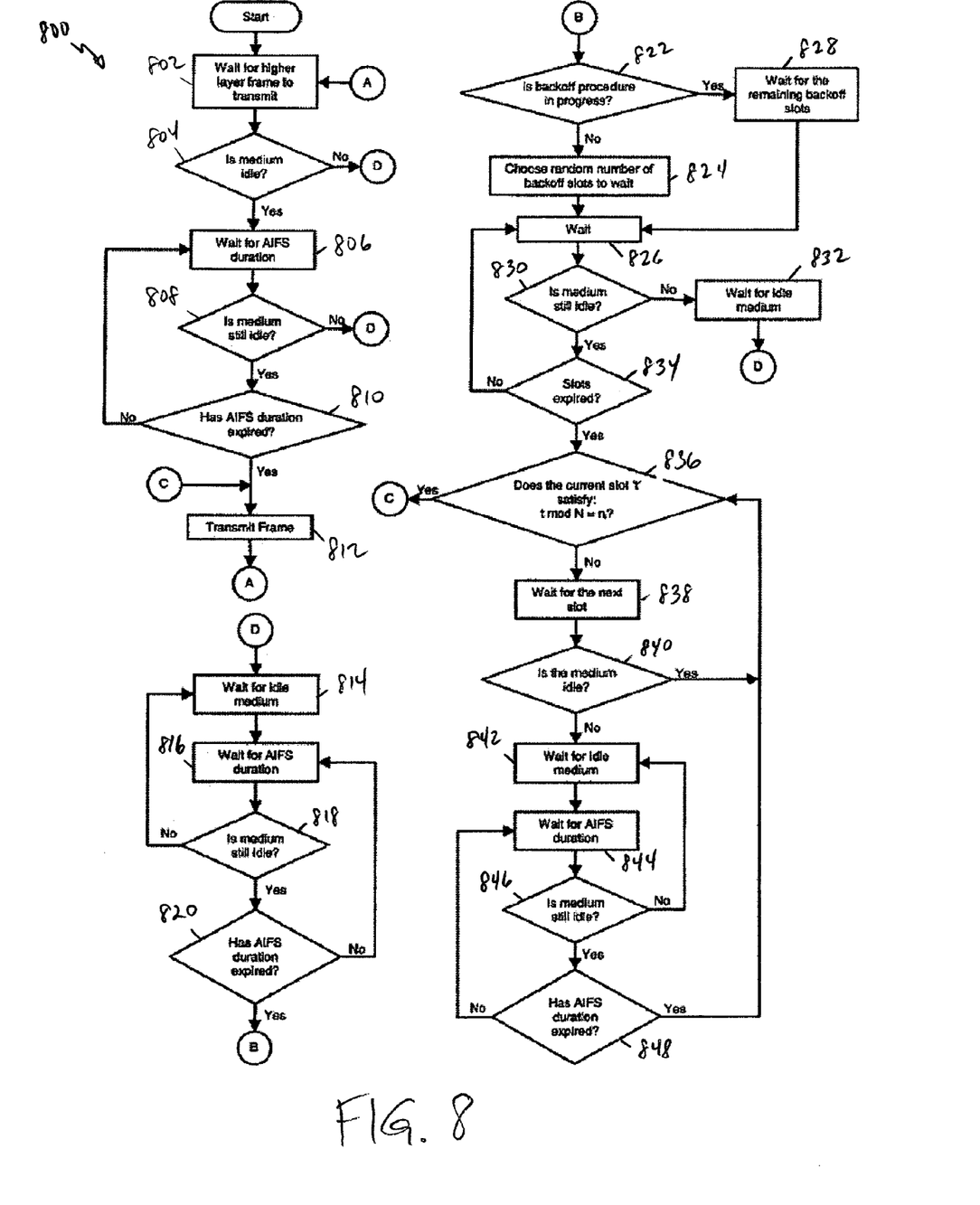
FIG. 8 is a flowchart illustrating a method of contending for access to a wireless medium using slot association, in accordance with an embodiment of the present invention.

FIG. 8 is a flowchart illustrating a method 800 of contending for access to a wireless medium using slot discrimination by slot association, in accordance with an embodiment of the present invention. Prior to executing method 800, the AP 205 and STAs 215 initialize slot information parameters. Initialization may occur periodically in beacon frames. Method 800 begins with the SDMAC 410/610 in step 802 waiting for a higher layer frame to transmit. In step 804, the SDMAC 410/610 determines if the medium is idle. If not idle, then the method 800 jumps to step 814. If idle, then the SDMAC 410/610 in step 806 waits (for an AIFS duration). If the SDMAC 410/610 in step 808 determines that the medium is still idle, then the SDMAC 410/610 in step 810 determines if the AIFS duration (i.e., SIFS+AIFSN×slot_time) has expired. If not expired, then the SDMAC 410/610 returns to step 806 to continue waiting. If the SDMAC 410/610 in step 808 determines that the medium is not idle, then the method 800 jumps to step 814. If the SDMAC 410/610 in step 810 determines that the AIFS duration has expired, then the SDMAC 410/610 in step 812 transmits the frame. Then, the method 800 returns to step 802.

In step 814, the SDMAC 410/610 waits for the medium to become idle. When idle, the SDMAC 410/610 in step 816 waits (for an AIFS duration). The SDMAC 410/610 in step 818 determines if the medium is still idle. If not idle, then the method 800 returns to step 814 to resume waiting. If still idle, then the SDMAC 410/610 in step 820 determines if the AIFS duration has expired. If not expired, then the method 800 returns to step 816 to continue waiting. If expired, then the method 800 jumps to step 822 to manage backoff procedures.

In step 822, the SDMAC 410/610 determines if the backoff procedures are currently in progress. If not in progress, then the SDMAC 410/610 in step 824 chooses a random number of backoff slots (between 1 and CW) to wait. The SDMAC 410/610 in step 826 waits. If the SDMAC 410/610 in step 822 determines that backoff procedures are in progress, then the SDMAC 410/610 in step 828 continues to wait for the remaining backoff slots to expire, and jumps to step 826 to continue waiting. The SDMAC 410/610 in step 830 determines if the medium is still idle. If not still idle, then the SDMAC 410/610 in step 832 waits for the medium to become idle, and the method 800 returns to step 814. If still idle, then the SDMAC 410/610 in step 834 determines if the backoff slots have expired. If not expired, then the method 800 returns to step 826 to continue waiting. If expired, then the method 800 proceeds to step 836.

In step 836, the SDMAC 410/610 determines if the current slot number, t, satisfies t mod N=$n_i$. If the function is satisfied, then the SDMAC 410/610 jumps to step 812 to transmit the frame. If the function is not satisfied, then the SDMAC 410/610 in step 838 waits for the next slot. The SDMAC 410/610 in step 840 determines if the medium is still idle. If still idle, then the SDMAC 410/610 returns to step 836 to determine if the function is satisfied. If not still idle, then the SDMAC 410/610 in step 842 waits for the medium to become idle. The SDMAC 410/610 in step 844 continues to wait (for an AIFS duration). The SDMAC 410/610 in step 846 determines if the medium is still idle. If not still idle, then the method 800 returns to step 842 to wait for the medium to become idle again. If still idle, then the SDMAC 410/610 in step 848 determines if the AIFS duration has expired. If not expired, then the method 800 returns to step 844 to continue waiting. If expired, then the method 800 returns to step 836 to determine if the function is satisfied.

Figure 9:
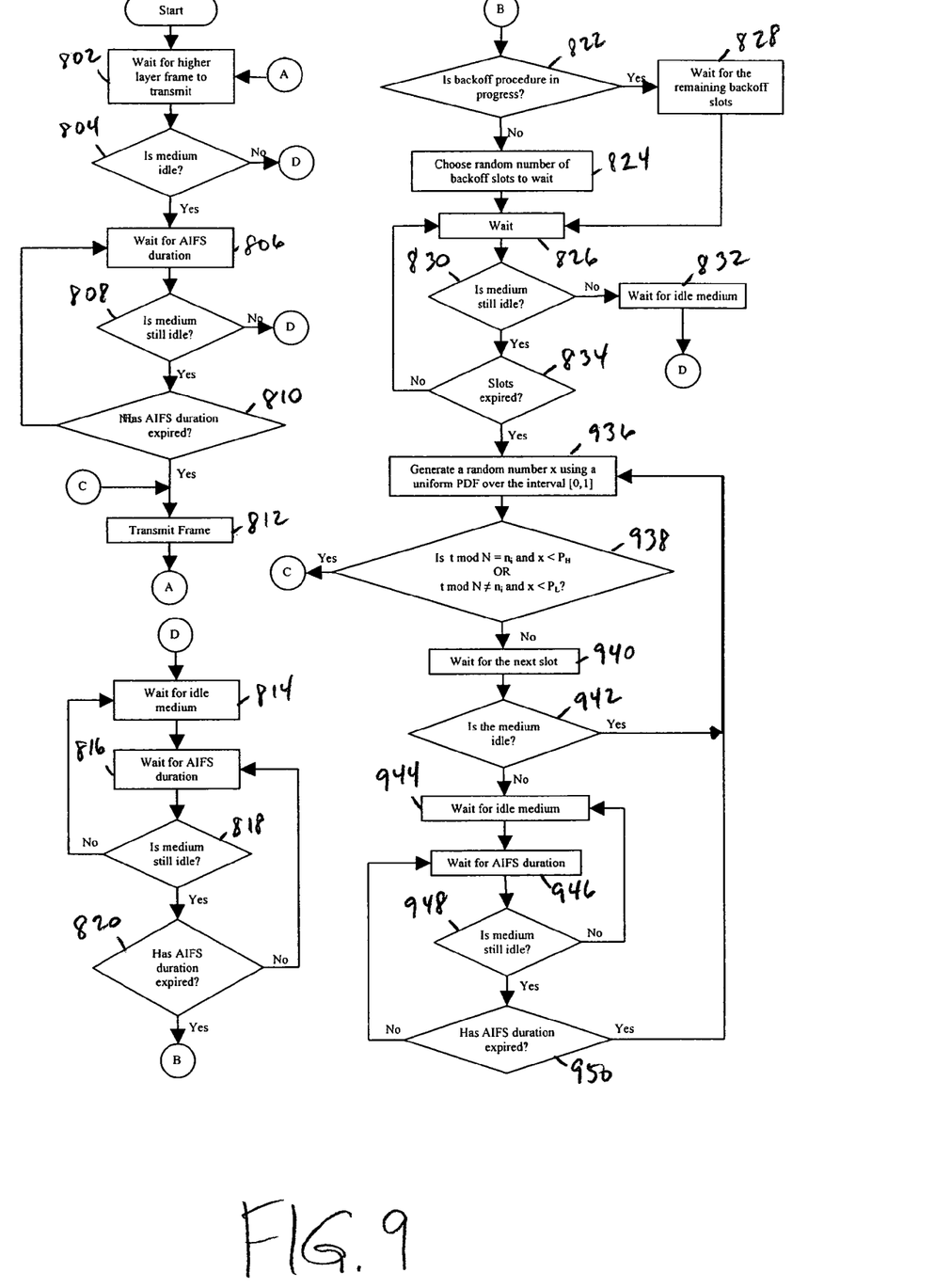
FIG. 9 is a flowchart illustrating a method of contending for access to a wireless medium using slot bias, in accordance with an embodiment of the present invention.

FIG. 9 is a flowchart illustrating a method 900 of contending for access to a wireless medium using slot discrimination by slot bias, in accordance with an embodiment of the present invention. Prior to executing method 800, the AP 205 and STAs 215 initialize slot information parameters (slot bias parameters). Initialization may occur periodically in beacon frames. Steps 802-834 of the method 900 are the same as steps 802-834 of the method 800. Generally, steps 802-834 manage AIFS and backoff procedures.

In step 936, after the backoff period has expired, the SDMAC 410/610 generates a random number X using a uniform probability density function (PDF) over the interval [0,1]. The SDMAC 410/610 in step 938 determines whether the random number X is less than a slot bias value (SBV) for the current slot. That is, the SDMAC 410/610 transmits if X[0,1]<$SBV_i$. In one embodiment, as shown, a particular slot (t mod N=$n_i$) may be assigned a high probability ($P_H$). All other slots (t mod N≠$n_i$) may be assigned a low probability ($P_L$). Then, when the current slot is the particular slot (t mod N=$n_i$), then the SDMAC 410/610 determines if the value X is less than $P_H$. When the current slot is not the particular slot (t mod N≠$n_i$), then the SDMAC 410/610 determines if the value X is less than $P_L$. If in step 938 the SDMAC 410/610 determines that the function is satisfied, then the SDMAC 410/610 proceeds to step 812 to transmit the frame. If in step 938 the SDMAC 410/610 determines that the function is not satisfied, then the SDMAC 410/610 in step 940 waits for the next slot. The SDMAC 410/610 in step 942 determines if the medium is still idle. If so, then the method 900 returns to step 936 to generate a new random number X. If the medium is not still idle, then the SDMAC 410/610 in step 944 waits for the medium to become idle again. The SDMAC 410/610 in step 946 waits (for an AIFS duration). The SDMAC 410/610 in step 948 determines if the medium is still idle. If not still idle, then the method 900 returns to step 944 to wait for the medium to become idle again. If still idle, then the SDMAC 410/610 in step 950 determines if the AIFS duration has expired. If not expired, then the method 900 returns to step 946 to continue waiting. If expired, then the method 900 returns to step 936 to generate another random value X.

It will be appreciated that FIG. 8 is a special case of FIG. 9 where $P_H$=1 and $P_L$=0.

Figure 10:
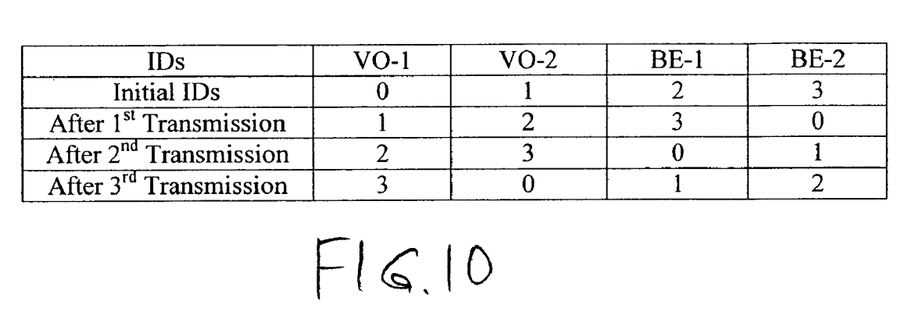
FIG. 10 is a table illustrating global rotation of slot assignments, in accordance with an embodiment of the present invention.

FIG. 10 is a table 1000 illustrating global AC rotation (e.g., round robin, weighted round robin, etc.) of slot assignments (slot association or slot bias), in accordance with an embodiment of the present invention. This implementation may avoid slot-order unfairness. As shown, there are four (4) ACs contending for access to a wireless medium. Initially, the ACs are ordered such that VO-1 is initially assigned (associated or biased) to slot number 4 ($n_i$=0); VO-2 is assigned to slot number 1 ($n_i$=1); BE-1 is assigned to slot number 2 ($n_i$=2); and BE-2 is assigned to slot number 3 ($n_i$=3). At the end of a frame transmission, all AP 205 and STAs 215 are in sync and can update their assigned slot numbers, $n_i$, simultaneously as: $n_i$=($n_i$+α) mod N, where α<N is an arbitrary integer assigned by the AP 205. Alternatively, only the STAs 215 may shift. It may be noted that updating the numbers $n_i$ as mentioned may preclude the same slot number, $n_i$, being assigned to multiple STAs 215. As shown, the IDs are shifted using $n_i$=($n_i$+α) mod N, where α=1 and N=4. That is, after the first transmission, VO-1 is assigned to slot number 1 ($n_i$=1); VO-2 is assigned to slot number 2 ($n_i$=2); BE-1 is assigned to slot number 3 ($n_i$=3); and BE-2 is assigned to slot number 4 ($n_i$=0). After the second transmission, VO-1 is assigned to slot number 2 ($n_i$=2); VO-2 is assigned to slot number 3 ($n_i$=3); BE-1 is assigned to slot number 4 ($n_i$=0); and BE-2 is assigned to slot number 1 ($n_i$=1). And, after the third transmission, VO-1 is assigned to slot number 3 ($n_i$=3); VO-2 is assigned to slot number 4 ($n_i$=0); BE-1 is assigned to slot number 1 ($n_i$=1); and BE-2 is assigned to slot number 2 ($n_i$=2).

Figure 11:
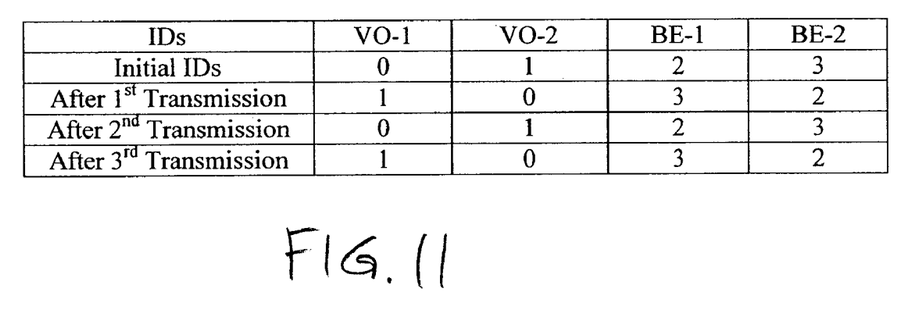
FIG. 11 is a table illustrating localized AC rotation of slot assignments, in accordance with an embodiment of the present invention.

FIG. 11 is a table 1100 illustrating localized AC rotation (e.g., round robin, weighted round robin, etc.) of slot assignments, in accordance with an embodiment of the present invention. This implementation may avoid slot-order unfairness and provide additional traffic differentiation based on AC. As shown, there are four (4) ACs contending for access to a wireless medium. Initially, the ACs are ordered such that VO-1 is assigned to slot number 4 ($n_i$=0); VO-2 is assigned to slot number 1 ($n_i$=1); BE-1 is assigned to slot number 2 ($n_i$=2); and BE-2 is assigned to slot number 3 ($n_i$=3). At the end of a frame transmission, all AP 205 and STAs 215 are in sync and can update their assigned slot numbers, $n_i$, simultaneously as: $n_i = L_{AC} + (n_i - L_{AC} + \alpha) \bmod N_{AC}$, where the AP 205 provides the slot-shifting information including the numbers $\{L_{AC}, N_{AC}, \alpha\}$ for each AC. Alternatively, only the STAs 215 may shift slot numbers. As shown, the IDs are obtained using $n_i = L_{AC} + (n_i - L_{AC} + \alpha) \bmod N_{AC}$, where $\alpha=1$, $L_{VO}=0$, $N_{VO}=2$, $L_{BE}=2$, $N_{BE}=2$. That is, after the first transmission, VO-1 is assigned to slot number 1 ($n_i$=1); VO-2 is assigned to slot number 4 ($n_i$=0); BE-1 is assigned to slot number 3 ($n_i$=3); and BE-2 is assigned to slot number 2 ($n_i$=2). After the second transmission, VO-1 is assigned to slot number 4 ($n_i$=0); VO-2 is assigned to slot number 1 ($n_i$=1); BE-1 is assigned to slot number 2 ($n_i$=2); and BE-2 is assigned to slot number 3 ($n_i$=3). And, after the third transmission, VO-1 is assigned to slot number 1 ($n_i$=1); VO-2 is assigned to slot number 4 ($n_i$=0); BE-1 is assigned to slot number 3 ($n_i$=3); and BE-2 is assigned to slot number 2 ($n_i$=2).

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general-purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A system in an IEEE 802.11 a wireless local area network, comprising:

a counter for counting slot numbers; and a storage device to store data corresponding to a channel access scheme providing access to a wireless network, said access scheme using a modulo partitioning backoff scheme providing a modulo partitioning backoff, said channel access scheme further providing traffic prioritization, wherein each transmitter is allowed channel access after a backoff counter becomes zero and a current slot number t satisfies the modulo condition:

t modulo N=$n_i$ where, t=a current slot number where a slot count begins at zero after short interface space (SIFS) interval past medium busy, N=total number of stations (STAs) in the wireless network, $n_i$=a Unique ID assigned by the AP to each station (STA), and wherein SIFS is shorter than distributed coordinated function interframe space (DIFS) and arbitrary interframe space (AIFS).

2. The system of claim 1, wherein said traffic prioritization is accomplished by using an arbitration interframe space (AIFS) interval defined on per-class basis, wherein multiple unique IDs, $n_i$, are assigned to different access classes (ACs) within the same STA.

3. The system of claim 2, wherein said modulo N is equal to number of STAs.

4. The system of claim 2, wherein said channel access scheme using a modulo partitioning backoff scheme further comprises:

a. setting backoff_counter=random (0, CW) and slot counter as t=0;

b. waiting SIFS duration after medium busy c. waiting one slot and if slot is idle, setting t=t+1 and repeating until t=AIFSN[AC]; if slot is not idle, set t=0 and go to step (b);

d. waiting one slot and if slot is idle, setting backoff_counter=transmitting a packet if t modulo N=$n_i$; if t modulo N≠$n_i$, wait one slot, set t=t+1, and, if slot is idle, repeat until t modulo N=$n_i$; if slot is not idle, return to step (b).

5. The system of claim 2, wherein said channel access scheme using a modulo partitioning backoff scheme further comprises:

a. setting backoff_counter=random (0, CW) and slot counter as t=0;

b. waiting SIFS duration after medium busy c. waiting one slot and if slot is idle, setting t=t+1 and repeating until t=AIFSN[AC]; if slot is not idle, set t=0 and go to step (b);

d. waiting one slot and if slot is idle, setting backoff_counter=backoff_counter−1, and t=t+1, and repeating until backoff_counter=0; if slot is not idle set t=0 and go to step (b);

e. transmitting a packet with high probability ($P_H$) if t modulo N=$n_i$, and with low probability ($P_L$) if t modulo N≠$n_i$; if no transmission occurs, wait one slot, set t=t+1, and, if slot is idle, repeat step (e); if slot is not idle, return to step (b).

* * * * *